Nov. 24, 1970 A. N. MILYAKH ET AL 3,543,133

ELECTROMAGNETIC FREQUENCY AND PHASE CONVERTER OF A MULTIPHASE SOURCE OF SUPPLY

Filed April 22, 1968 2 Sheets-Sheet 1

United States Patent Office 3,543,133

Patented Nov. 24, 1970

3,543,133
ELECTROMAGNETIC FREQUENCY AND PHASE CONVERTER OF A MULTIPHASE SOURCE OF SUPPLY

Alexandr Nikolaevich Milyakh, Boris Evgenievich Kubyshin, and Robert Petrovich Kartashov, Kiev, U.S.S.R., assignors to Institut Elektrodinamiki An U.S.S.R., Kiev, U.S.S.R.

Filed Apr. 22, 1968, Ser. No. 723,115
Int. Cl. H02m 5/14, 5/16
U.S. Cl. 321—7 1 Claim

ABSTRACT OF THE DISCLOSURE

A frequency and phase converter employing a square wave generator with a number of phase outputs equal to the number of phases in the source to be controlled and with magnetic amplifiers connected to the generator.

The present invention relates to devices for conversion of the frequency and number of phases of a multi-phase source of supply and can be used to advantage in systems of frequency stabilization, as well as variable-frequency drives and, particularly, those that are employed for driving pumps, axial and centrifugal fans, blowers, turbo-compressors, etc.

Known in the art are electromagnetic frequency and phase converters comprising magnetic amplifiers the primary windings of which are connected to a three-phase source of supply, whereas the control windings of the amplifiers operate in series and are connected to the source of direct-current supply, the series-connected secondary windings serving as the output of the device.

Such converters, however, provide only multiplication of the frequency and do not insure continuous (stepless) control of the latter.

Other known types of electromagnetic amplifiers incorporate push-pull magnetic amplifiers the outputs of which are connected to the load through ballast resistors, the control windings being connected to a control pulse generator (as an example, see U.S.S.R. Inventor's Certificate No. 163,670).

Such devices enable continuous control of the output frequency, but allow to obtain only very low frequencies ranging from 0 to ⅓ of the supply frequency and have an efficiency as low as 50 percent.

The object of the invention proposed herein is to eliminate said inherent disadvantages of known devices and to improve their efficiency.

In accordance with the present invention, these and other objects are attained by the development of a converter wherein the control device is a square-pulse generator having a number of phases equal to that of the source of supply, the control windings of the push-pull magnetic amplifiers of the electromagnetic converter being connected to the respective phase outputs of the control device.

It is recommended to employ a generator of square current pulses as the multiphase generator of square control pulses.

An advantage of the device proposed herein according to the present invention is that the output frequency control band is transferred into the supply frequency region and, also, that the amplitude of the output voltage is dependent on the output frequency, this allowing to operate frequency-controlled motors under optimum duty conditions and to maintain the output voltage at a preset level in systems of frequency stabilization.

The present invention will further be described by way of example with reference to the accompanying drawings, wherein.

The control device is diagrammatically shown in the above-mentioned drawings as many different types of multiphase square-pulse generators may be used for this purpose.

The drawings represent examples of the embodiment of the herein-described invention as applied to three-phase sources of supply. The circuit diagrams of converters for sources of supply having a greater number of phases are built up in a similar manner.

Figure 1:
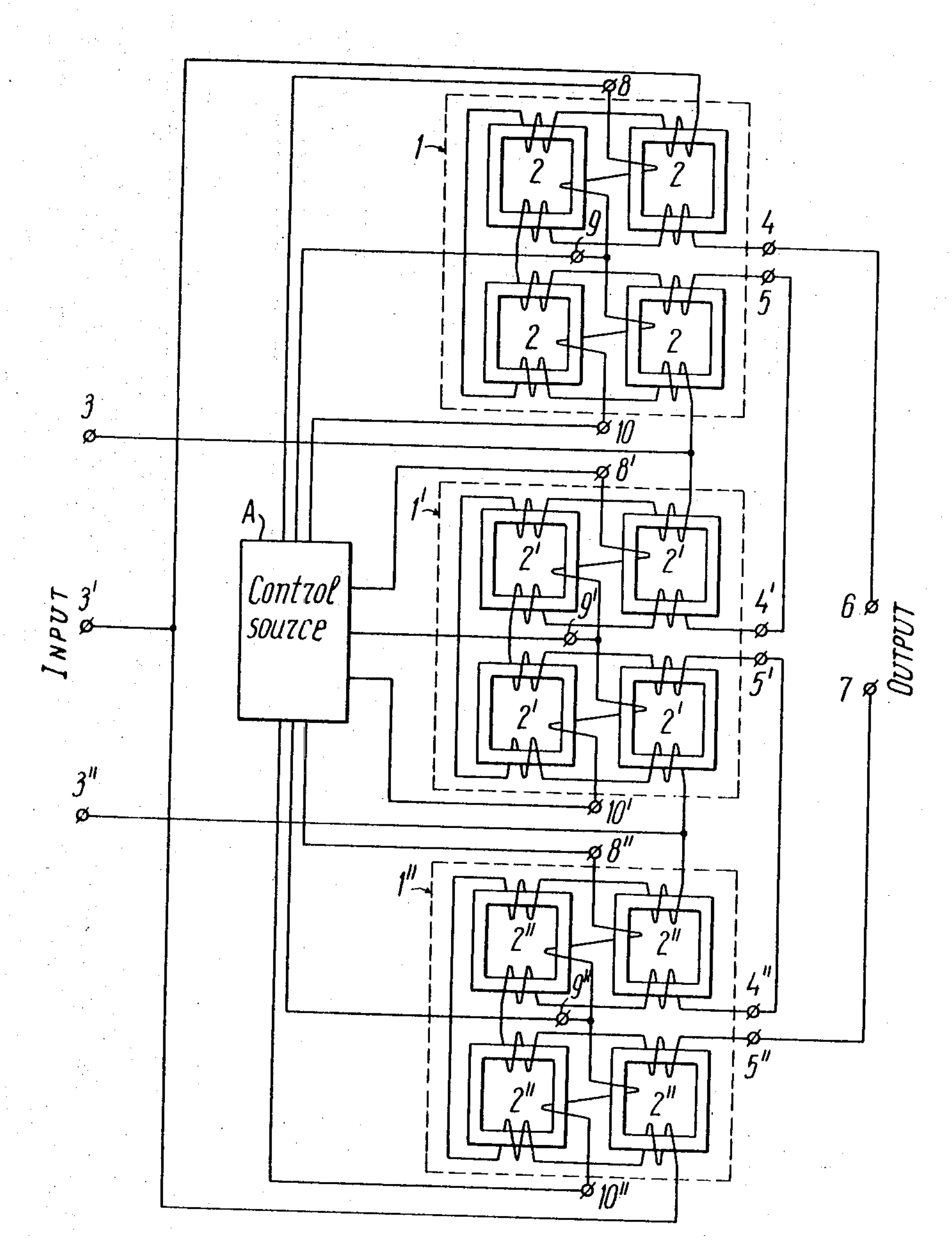
FIG. 1 shows the circuit diagram of the hereinproposed device according to the present invention employing push-pull differential magnetic amplifiers.

The electromagnetic frequency and phase converter consists of three transformer-type differential push-pull magnetic amplifiers 1, 1′ and 1″ (see FIG. 1).

Primary windings 2, 2′ and 2″ of these amplifiers are connected to terminals 3, 3′ and 3″ through which the device is supplied. Outputs 4–5, 4′–5′ and 4″–5″ of magnetic amplifiers 1, 1′ and 1″ are connected in series and constitute output 6–7 of the converter. The control windings of the magnetic amplifiers are connected to the corresponding phase outputs of the device A with a controllable frequency of repetition of square pulses and having a number of phases equal to that of the source of supply through terminals 8–9–10, 8′–9′–10′ and 8″–9″–10″.

The converter proposed herein operates in the following way.

The operation of the generator of control square current pulses is initiated simultaneously with connection of terminals 3–3′–3″ to the phase lines of the source of supply. This being accomplished, at outputs 4–5, 4′–5′ and 4″–5″ of the magnetic amplifiers there appear voltages the phases of which are reversed periodically according to the frequency of repetition of the control pulses, the moments of time at which these changes occur in each amplifier being shifted with respect to each other by ⅓ of the period of repetition of the control pulses. These voltages are integrated due to the series connection of outputs 4–5, 4′–5′ and 4″–5″ of magnetic amplifiers 1, 1′ and 1″. As a result, at output 6–7 of the device voltage is produced, the fundamental harmonic of which is equal to the difference between the supply and control frequencies at a forward sequence of the supply voltage and control pulse phase and to the sum of these frequencies at a reverse sequence of the above phases.

Figure 2:
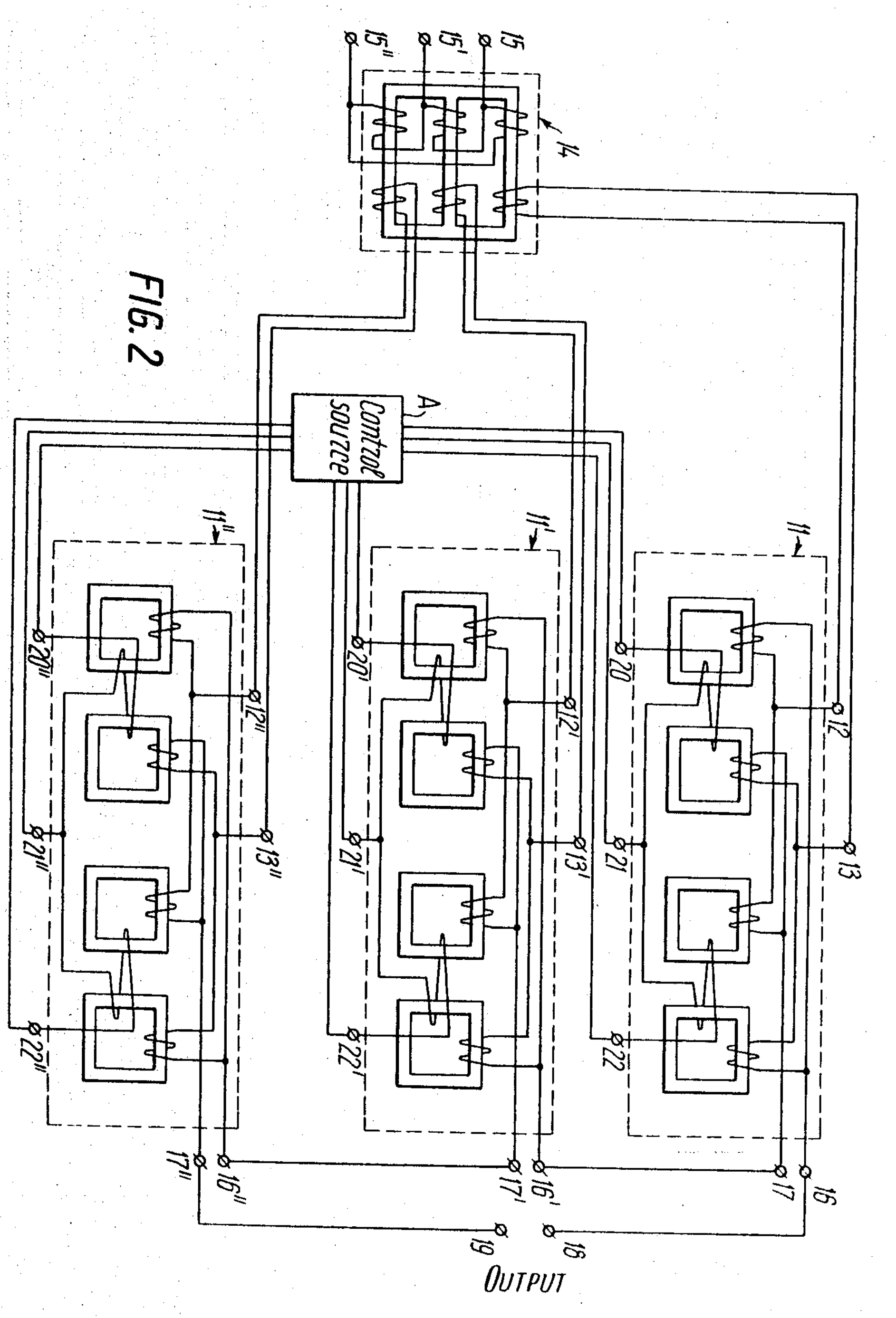
FIG. 2 shows the circuit diagram of the hereinproposed device according to the present inventiton employing bridge-type push-pull magnetic amplifiers.

When bridge-type push-pull magnetic amplifiers 11, 11′ and 11″ are employed (see FIG. 2), their primary windings 12–13, 12′–13′ and 12″–13″ are connected via three-phase isolating transformer 14 to terminals 15, 15′ and 15″ through which the device is supplied. In cases when the sources of phase voltage supply are provided with resistance decoupling, isolating transformer 14 is not required.

Outputs 16–17, 16′–17′ and 16″–17″ of bridge-type magnetic amplifiers 11, 11′ and 11″ are series-connected and make up outputs 18–19 of the device. The control windings of the amplifiers are connected to the corresponding phase outputs of the control pulse generator via terminals 20–21–22, 20′–21′–22′ and 20″–21″–22″.

The device employing bridge-type push-pull magnetic amplifiers (see FIG. 2) operates in the same way as the device employing transformer-type magnetic amplifiers (see FIG. 1).

An advantage of the circuit employing bridge-type amplifiers is that the weight of the active materials of the device is less as compared with the circuit employing transformer-type magnetic amplifiers.

This advantage is especially notable in cases when a resistance decoupling of the phases of the sources of supply voltages is provided.

The device described herein according to the invention may also employ push-pull differential magnetic amplifiers having a transformer with or without a neutral point.

The hereinproposed device enables continuous control of the supply frequency within a 15 to 25 percent range by the use of electromagnetic devices, allows to supply a single-phase load from a multiphase power supply mains and allows to improve the efficiency of the converter up to about 80 to 90 percent.

What we claim is:

1. An electromagnetic frequency and phase converter of a multiphase source of supply comprising a generator of square control pulses having a number of phase outputs equal to the number of phases of said source of supply, and push-pull magnetic amplifiers in a number equal to the number of phases of the source of supply; each of said magnetic amplifiers including at least primary and control windings; said primary windings being adapted to be connected to the corresponding phases of said source of supply, said control windings of said magnetic amplifiers being connected to the corresponding phase outputs of said generator of square pulses, the outputs of said amplifiers having a series connection and being connected in the course of operation to a source of loading.

References Cited

UNITED STATES PATENTS

| | | | |
|---|---|---|---|
| 1,918,173 | 7/1933 | Bedford | 323—56 XR |
| 2,666,178 | 1/1954 | Kramer | 321—7 |
| 2,820,942 | 1/1958 | Depenbrock | 321—68 |
| 2,849,674 | 8/1958 | Biringer | 321—68 |
| 3,118,104 | 1/1964 | Toffolo | 323—56 XR |
| 3,229,192 | 1/1966 | Budny | 321—68 |
| 3,271,690 | 9/1966 | Cockrell | 330—8 |

WILLIAM M. SHOOP, Jr., Primary Examiner

U.S. Cl. X.R.

321—57, 68; 323—56, 89